(12) United States Patent (10) Patent No.: US 9,166,217 B2
Ha (45) Date of Patent: Oct. 20, 2015

(54) SECONDARY BATTERY

(75) Inventor: Yunkyung Ha, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 794 days.

(21) Appl. No.: 13/368,516

(22) Filed: Feb. 8, 2012

(65) Prior Publication Data

US 2012/0231307 A1 Sep. 13, 2012

(30) Foreign Application Priority Data

Mar. 10, 2011 (KR) ........................ 10-2011-0021342

(51) Int. Cl.
| | |
|---|---|
| *H01M 2/12* | (2006.01) |
| *H01M 2/34* | (2006.01) |
| *H01M 2/06* | (2006.01) |
| *H01M 2/16* | (2006.01) |
| *H01M 2/22* | (2006.01) |

(52) U.S. Cl.
CPC ........ *H01M 2/34* (2013.01); *H01M 2/06* (2013.01); *H01M 2/16* (2013.01); *H01M 2/22* (2013.01); *H01M 2/12* (2013.01)

(58) Field of Classification Search
CPC ........................................................ H01M 2/12
USPC .......................................................... 429/82
See application file for complete search history.

(56) References Cited

U.S. PATENT DOCUMENTS

| 2003/0049527 | A1* | 3/2003 | Yageta et al. ................ 429/179 |
| 2003/0148173 | A1* | 8/2003 | Gu ................................... 429/62 |
| 2003/0232236 | A1 | 12/2003 | Mitchell et al. |
| 2007/0202399 | A1 | 8/2007 | Shin et al. |
| 2008/0292962 | A1* | 11/2008 | Jung ............................. 429/211 |
| 2009/0035654 | A1* | 2/2009 | Kodama ........................ 429/179 |
| 2009/0162749 | A1 | 6/2009 | Lee |
| 2010/0035144 | A1* | 2/2010 | Oh et al. ........................ 429/164 |
| 2010/0143802 | A1* | 6/2010 | Takei ............................. 429/223 |
| 2010/0255368 | A1 | 10/2010 | Park et al. |

FOREIGN PATENT DOCUMENTS

| KR | 1020040110156 A | 12/2004 |
| KR | 1020060035885 A | 4/2006 |

(Continued)

OTHER PUBLICATIONS

Korean Notice of Allowance dated on Mar. 25, 2013 issued by KIPO in connection with Korean Patent Application No. 10-2011-0021342 with Request for the Entry of accompanying Office Action.

(Continued)

*Primary Examiner* — Jonathan G Leong
*Assistant Examiner* — James Erwin
(74) *Attorney, Agent, or Firm* — Robert E. Bushnell, Esq.

(57) ABSTRACT

Provided is a secondary battery, which can prevent explosion and fire of the battery by melting a safety film formed on an electrode tab to quickly clear a sealed state of a case when the internal temperature or pressure of the battery rises. The secondary battery includes an electrode assembly including a first electrode tab and a second electrode tab, and a case accommodating the electrode assembly such that the electrode tab is exposed to the outside. At least one of the first and second electrode tabs has a recess formed lengthwise on at least one of top and bottom surfaces of the at least one of the first and second electrode tabs, and a safety film is positioned in the recess.

17 Claims, 5 Drawing Sheets

(56) References Cited

FOREIGN PATENT DOCUMENTS

| KR | 1020070049553 | 5/2007 |
| KR | 2008-0090769 A | 10/2008 |
| KR | 2009-0067580 A | 6/2009 |
| KR | 1020090060497 A | 6/2009 |
| KR | 101011607 B1 | 2/2011 |

OTHER PUBLICATIONS

Korean Office Action issued on Sep. 17, 2012 by the KIPO in the corresponding Korean Patent Application No. 10-2011-0021342.

* cited by examiner

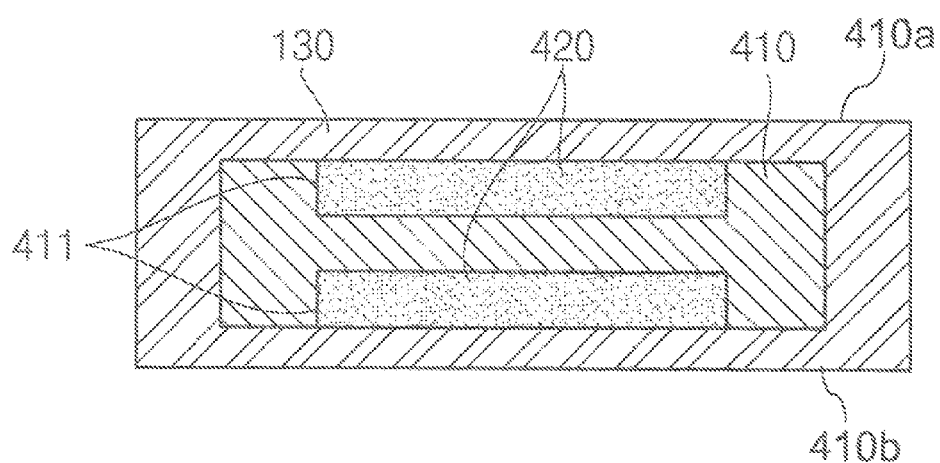

SECONDARY BATTERY

CLAIM OF PRIORITY

This application makes reference to, incorporates the same herein, and claims all benefits accruing under 35 U.S.C. §119 from an application earlier filed in the Korean Intellectual Property Office on Mar. 10, 2011 and there duly assigned Serial No. 10-2011-0021342.

BACKGROUND OF THE INVENTION

1. Field of the Invention

Embodiments of the present invention relate to a secondary battery.

2. Description of the Related Art

In a secondary battery, when internal abnormality, such as over-charge, over-discharge or internal short-circuit, occurs to the battery, an electrolyte inside the battery may be decomposed, so that gases such as carbon dioxide or carbon monoxide are generated, resulting in an increase of an internal pressure of the battery. In this case, there is a risk of explosion or fire occurring to the secondary battery.

Therefore, the secondary battery is subjected to safety tests against over-discharge or forced discharge, and various thermal stability tests, including a high-temperature retention test, a thermal shock test and so on. In the thermal stability tests, explosion and fire of a battery is determined while allowing the battery to stand at various temperatures for several to several tens of minutes.

SUMMARY OF THE INVENTION

It is an aspect of the present invention to provide an improved secondary battery.

It is another aspect of the present invention to provide a secondary battery which can prevent explosion and fire of the battery.

In the secondary battery constructed as the embodiment according to the principles of the present invention, explosion and fire of the battery can be prevented by forming a safety film on an electrode tab to quickly clear a sealed state of a case such that the safety film is melted when the internal temperature or pressure of the battery rises.

According to an embodiment of the present invention, a secondary battery is constructed with an electrode assembly including a first electrode tab and a second electrode tab, and a case accommodating the insertion and continued internal residency of the electrode assembly inside of the case such that the electrode tab is exposed to the exterior of the case after the case has been closed and sealed. At least one of the first and second electrode tabs has a recess formed in a lengthwise direction of the at least one of the first and second electrode tabs on at least one of top and bottom surfaces of the at least one of the first and second electrode tabs. A safety film is positioned inside the recess.

The secondary battery may further include an insulation tape surrounding both the safety film and the corresponding first or second electrode tab.

A melting point of the safety film may be lower than that of the insulation tape.

The case may be fabricated from a multi-layered, laminated sheet, and may include an innermost, layer, a middle layer and an outermost layer, and a melting point of the safety film is lower than that of the innermost layer.

The melting point of the safety film may be in a range of approximately 80° C. to approximately 90° C.

In addition, opposing ends of the safety film in the lengthwise direction of the first or the second electrode tab may be exposed to the outside of the insulation tape.

The safety film may have a thickness of approximately 20% to approximately 50% of that of the first or the second electrode tab.

In addition, the safety film may have a width of approximately 20% to approximately 50% of that of the first or the second electrode tab.

Further, the safety film may have a non-planar surface contacting the inner surface of the recess formed in the first or the second electrode tab.

In addition, the safety film may be divided into a plurality of parts in a widthwise direction of the first or the second electrode tab.

A sum of widths of the plurality of parts of the safety film may be approximately 20% to approximately 50% of the width of the first or the second electrode tab.

The recess may be formed on both of the top and bottom surfaces of the first or the second electrode tab, and the safety film may be formed in the recess formed on both of the top and bottom surfaces of the first or the second electrode tab.

A sum of widths of the respective safety film formed in the recess on both of the top and bottom surfaces of the first or the second electrode tab may be 20% to 50% of the width of the first or the second electrode tab.

The safety film may be formed of low density polyethylene.

A top surface of the safety film may be coplanar with the top surface of the first or the second electrode tab formed in the recess.

The first electrode tab may be formed as a positive electrode tab, the second electrode tab may be formed as a negative electrode tab, the first electrode tab may include a recess formed in a lengthwise direction of the first electrode tab, and the safety film may be positioned in the recess.

An innermost layer of the case may be formed of casted polypropylene.

The safety film may extend into the interior of the case and be in physical contact with the innermost layer of the case that, in essence, forms a lining of the interior of the case.

Additional aspects and/or advantages of the invention will be set forth in part in the description which follows and, in part, will be obvious from the description, or may be learned by practice of the invention.

BRIEF DESCRIPTION OF THE DRAWINGS

A more complete appreciation of the invention, and many of the attendant advantages thereof, will be readily apparent as the same becomes better understood by the reference to the following detailed description when considered in conjunction with the accompanying drawings in which like reference symbols indicate the same or similar components, wherein:

FIG. 7 is a cross-sectional view of a part of a secondary battery constructed as a further embodiment according to the principles of the present invention.

DETAILED DESCRIPTION OF THE INVENTION

In a prismatic secondary battery, explosion and fire of the battery may be prevented by installing a safety vent in a battery case in order to release internal gases when the internal pressure of the battery increases, thereby improving the safety of the secondary battery. But, for a pouch type secondary battery in which a battery case is made of a flexible material, installation of a safety vent is difficult, and may be functionally problematical.

Hereinafter, a secondary battery that may be fabricated according to the principles of the present invention will be described in detail with reference to the accompanying drawings.

Figure 1:
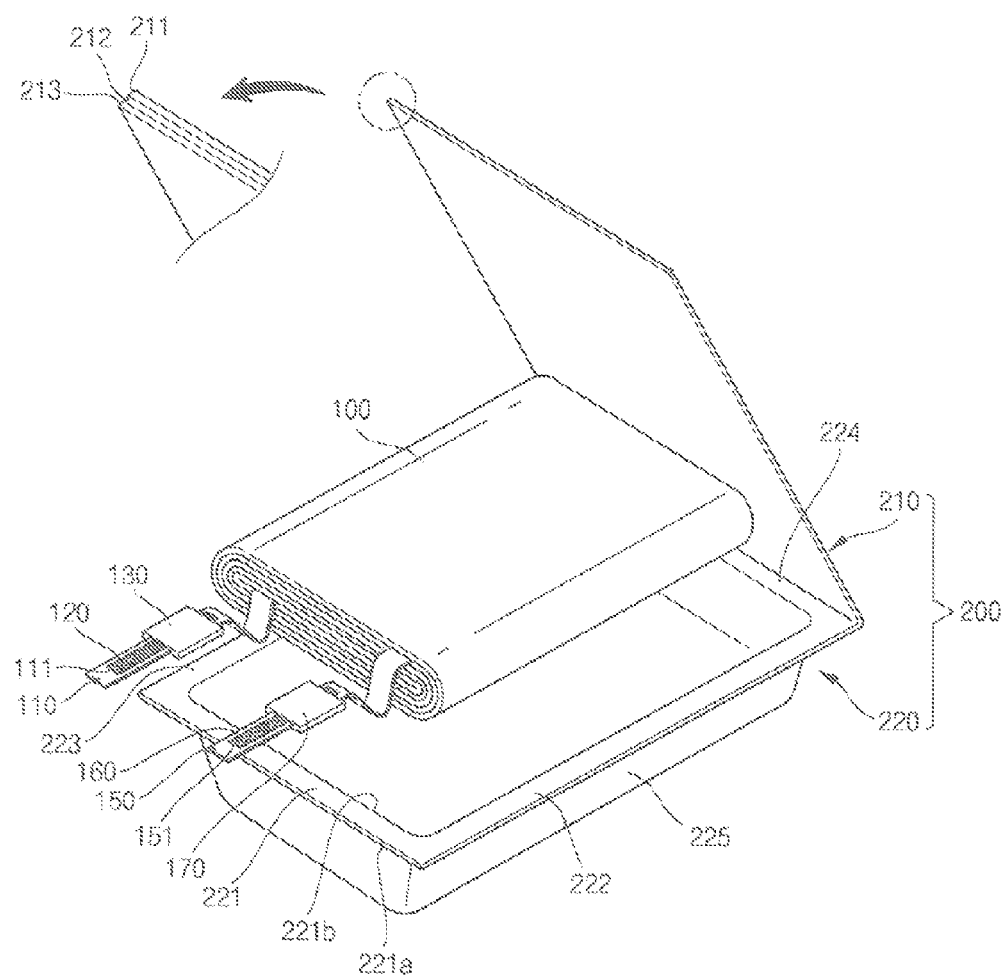
FIG. 1 is an oblique view of a secondary battery constructed as an embodiment according to the principles of the present invention.
Figure 2:
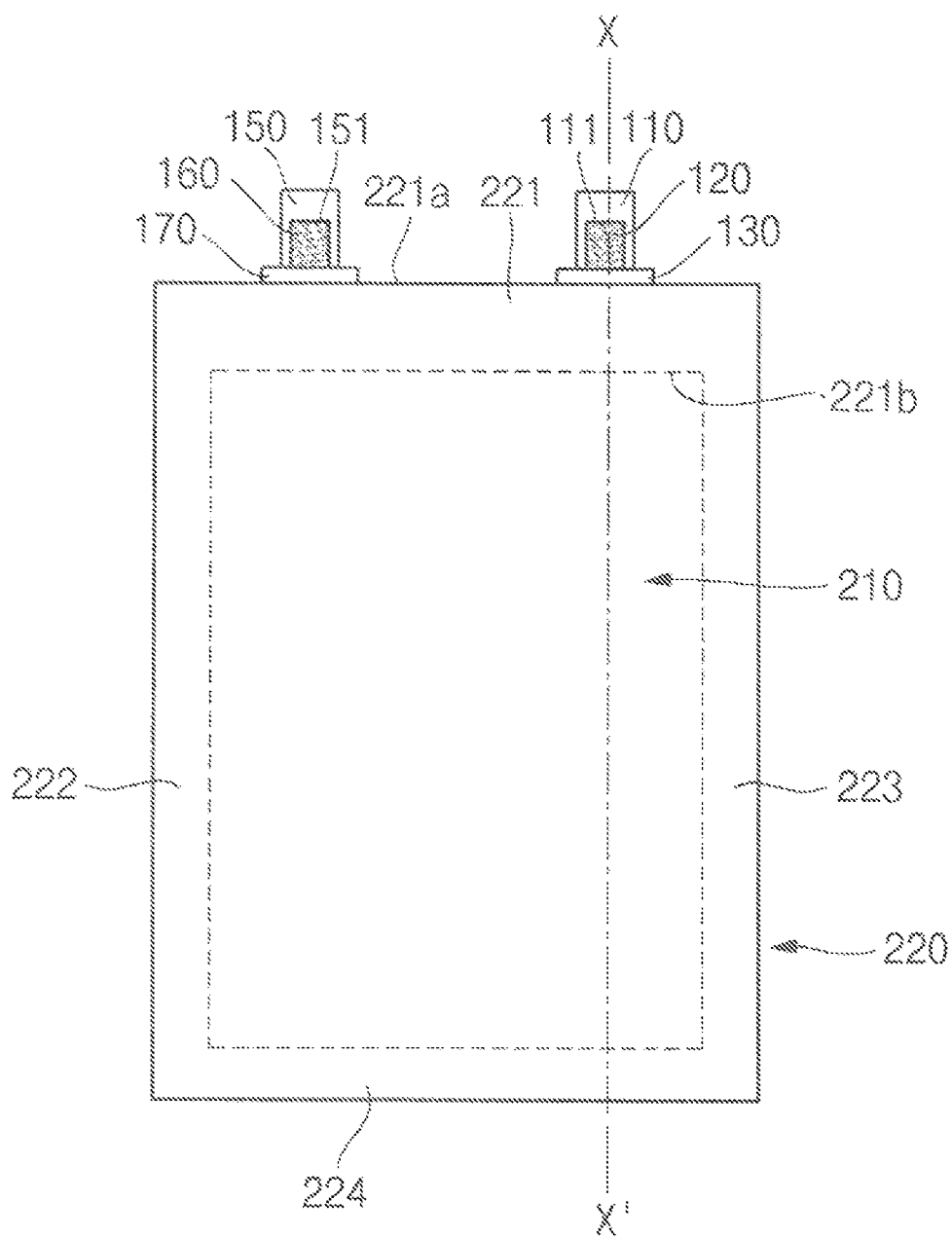
FIG. 2 is a plan view of the secondary battery shown in FIG. 1.
Figure 3:
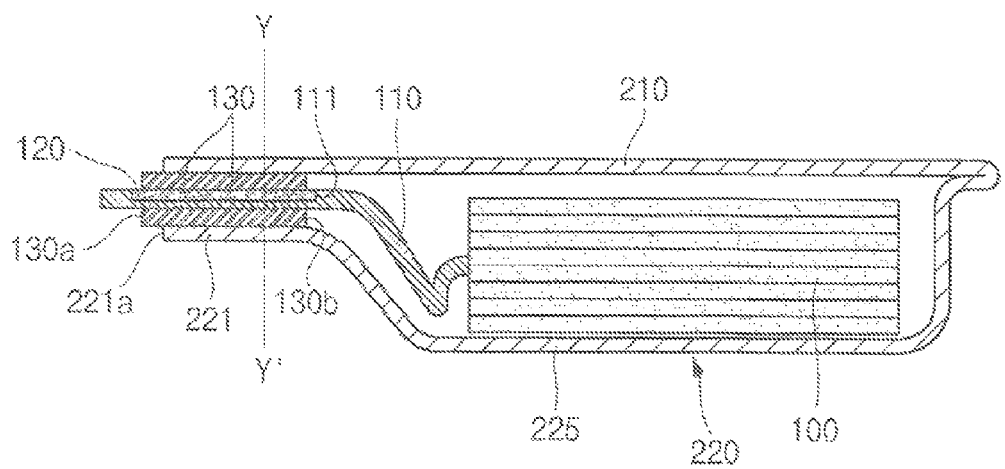
FIG. 3 is a cross-sectional view of the secondary battery shown in FIG. 2, taken along sectional line X-X'.
Figure 4:
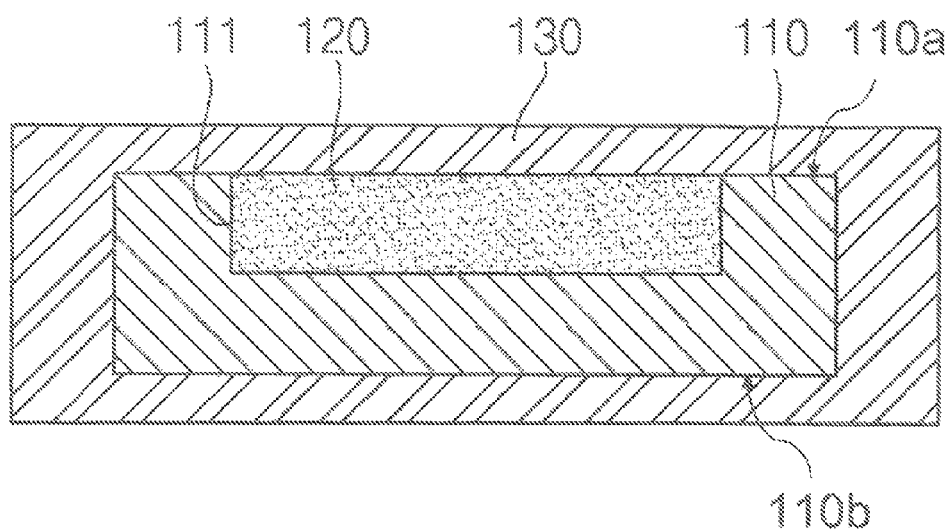
FIG. 4 is a cross-sectional view of the secondary battery shown in FIG. 3, taken along sectional line Y-Y'.

A secondary battery constructed as an embodiment according to the principles of the present invention will first be described. FIG. 1 is an oblique view of a secondary battery constructed as an embodiment according to the principles of the present invention, FIG. 2 is a plan view of the secondary battery shown in FIG. 1, FIG. 3 is a cross-sectional view of the secondary battery shown in FIG. 2, taken along line X-X', and FIG. 4 is a cross-sectional view of the secondary battery shown in FIG. 3, taken along line Y-Y'.

Referring to FIGS. 1 through 4, the secondary battery according to the embodiment of the present invention includes an electrode assembly 100 and a case 200 accommodating electrode assembly 100.

Electrode assembly 100 is formed by interposing a separator between a first electrode plate and a second electrode plate and winding the resultant structure. The first electrode plate may be formed as a negative electrode plate and the second electrode plate may be formed as a positive electrode plate, and vice versa. When the first electrode plate is formed as a negative electrode plate, the first electrode, plate may include a negative electrode current collector formed of a thin film, for example, a copper foil, and a negative electrode active material layer generally made of a carbon material coated on both surfaces of the negative electrode current collector. In addition, a negative electrode uncoated portion that is not coated with a negative electrode active material is formed on either end of the negative electrode current collector. When the second electrode plate is formed as a positive electrode plate, the second electrode plate may include a positive electrode current collector formed of a thin film, for example, an aluminum foil, and a positive electrode active material layer generally made of a lithium oxide coated on both surfaces of the positive electrode current collector. In addition, a positive electrode uncoated portion that is not coated with a positive electrode active material is formed on either end of the positive electrode current collector.

Electrode assembly 100 has a first electrode tab 110 formed at one side of the first electrode plate and a second electrode tab 150 formed at one side of the second electrode plate. In a wound state, first electrode tab 110 and second electrode tab 150 are disposed at a constant interval in parallel with each other. When the first electrode plate is formed as a negative electrode plate, first electrode tab 110 is formed as a negative electrode tab and second electrode tab 150 is formed as a positive electrode tab. Alternatively, when the first electrode plate and the second electrode plate have opposite polarities, first electrode tab 110 may be formed as a positive electrode tab and second electrode tab 150 may be formed as a negative electrode tab. First electrode tab 110 and second electrode tab 150 have parts exposed to the outside to allow electrode assembly 100 to be electrically connected to the outside. First electrode tab 110 and second electrode tab 150 are generally made of a metal, such as aluminum, copper or nickel. In order to minimize a voltage drop, the metal used may have electrical conductivity exceeding a predetermined level. In the following description, in a case where both of first electrode tab 110 and second electrode tab 150 are required to be described, first electrode tab 110 and second electrode tab 150 are referred to as electrode tabs 110 and 150.

Electrode tabs 110 and 150 include recesses 111 and 151 formed lengthwise, that is, in a direction in which electrode tabs 110 and 150 are drawn out, at a predetermined location of one of top and bottom surfaces 110a and 110b of electrode tabs 110 and 150. Safety films 120 and 160 formed in recesses 111 and 151. In addition, electrode tabs 110 and 150 include insulation tapes 130 and 170 adhered to portions contacting sealing portions of the edge of case 200.

Recesses 111 and 151 are spaces for accommodating safety films 120 and 160. Recesses 111 and 151 are formed at portions of one of top and bottom surfaces of electrode tabs 110 and 150 in a lengthwise direction in which electrode tabs 110 and 150 are drawn out. Locations, sizes and shapes of recesses 111 and 151 will later be described along with those of safety films 120 and 160 located, sized and shaped corresponding to recesses 111 and 151.

Safety films 120 and 160 are shaped and sized corresponding to recesses 111 and 151, and formed in recesses 111 and 151 by a resin-molding process. Safety films 120 and 160 are melted when electrode tabs 110 and 150 are overheated due to abnormal operation of the secondary battery, thereby releasing gases generated in the secondary battery through recesses 111 and 151. That is to say, safety films 120 and 160 serve as safety vents at the sealing portions of case 200. In one embodiment according to the principles of the present invention, top surfaces of safety films 120 and 160 are coplanar with top surfaces of electrode tabs 110 and 150. That is to say, a thickness of each of safety films 120 and 160 is the same as a thickness of each of recesses 111 and 151. When the top surfaces of safety films 120 and 160 are higher or lower than the top surfaces of electrode tabs 110 and 150, the sealing portions of case 200 may not be completely sealed. In addition, since safety films 120 and 160 directly contact electrode tabs 110 and 150 where the largest amount of heat is generated in the secondary battery, safety films 120 and 160 can quickly respond to a temperature rise of the secondary battery compared to a case where safety films 120 and 160 are formed in the other portions.

In one embodiment according to the principles of the present invention, safety films 120 and 160 are formed of a material having a melting point lower than insulation tapes 130 and 170 and an innermost layer 213 of case 200. In this case, the melting of insulation tapes 130 and 170 and innermost layer 213 of case 200 due to over-heating of electrode tabs 110 and 150 may be preceded by releasing of the gases to the outside of case 200. Safety films 120 and 160 may be formed of a polyethylene (PE)-based resin. Safety films 120 and 160 formed of the PE-based resin may have a melting point in a range of approximately 80° C. to 140° C. The PE-based resin may burn by itself when it is melted. Therefore, safety films 120 and 160 formed of the PE-based resin are melted and burnt when electrode tabs 110 and 150 generate heat at a temperature greater than or equal to the melting point of safety films 120 and 160, providing spaces to which the internal gases of the secondary battery can be released. In one embodiment according to the principles of the present invention, safety films 120 and 160 are made of low density polyethylene (LDPE). The LIVE is polyethylene (PE) having a density of approximately 0.91, and has a relatively low melting point in a range of approximately 80° C. to approximately 90° C. Therefore, safety films 120 and 160 made of LDPE can be relatively quickly melted when electrode tabs 110 and 150 generate heat.

In addition, thicknesses and widths of safety films 120 and 160 are approximately 20% to 50% of those of electrode tabs 110 and 150, respectively. If the thicknesses and widths of safety films 120 and 160 are below the range stated above, safety films 120 and 160 may not serve as safety vents even if safety films 120 and 160 are melted when electrode tabs 110 and 150 are overheated due to abnormal operation of the secondary battery. On the contrary, if the thicknesses and widths of safety films 120 and 160 are beyond the range stated above, it is difficult to obtain the rigidity of electrode tabs 110 and 150, and the cross-sectional areas occupied by electrode tabs 110 and 150 may be reduced, thereby increasing electrical resistance of electrode tabs 110 and 150.

While FIGS. 1 through 4 illustrate that the secondary battery according to the embodiment of the present invention includes safety films 120 and 160 that are rectangular, the shapes of safety films 120 and 160 are not limited thereto. That is to say, safety film 120, 160 may have various cross-sectional shapes, including a hemispherical shape, or an inverted triangular shape. In addition, while FIGS. 1 through 4 illustrate that the secondary battery according to the embodiment of the present invention includes safety films 120 and 160 that are formed only on top surfaces of electrode tabs 110 and 150, safety films 120 and 160 may also be formed on bottom surfaces of electrode tabs 110 and 150. In addition, while FIGS. 1 through 4 illustrate that the secondary battery according to the embodiment of the present invention includes safety films 120 and 160 that are formed on both of first electrode tab 110 and second electrode tab 150, safety films 120 and 160 may be formed on any one of first electrode tab 110 and second electrode tab 150. In one embodiment according to the principles of the present invention where safety films 120 and 160 are formed only on one of first electrode tab 110 and second electrode tab 150, safety films 120 and 160 are formed on the positive electrode tab in which a larger amount of heat is generated than in the negative electrode tab, so that sealing of case 200 can be more quickly canceled in the positive electrode tab.

Insulation tapes 130 and 170 are wound around portions of electrode tabs 110 and 150 where safety films 120 and 160 are formed, respectively. More specifically, insulation tapes 130 and 170 are adhered to portions contacting the sealing portions of case 200, thereby preventing electrical short-circuits between each of electrode tabs 110 and 150 and case 200. In one embodiment according to the principles of the present invention, opposing ends 130a and 130b of insulation tape 130, disposed in a lengthwise direction in which electrode tab 110 is drawn out, are located at a region where safety film 120 is formed. That is to say, lengthwise opposing ends of electrode tabs 110 and 150 and safety films 120 and 160 are exposed to outsides of insulation tapes 130 and 170, respectively. This is for the purpose of allowing gases generated in case 200 to be released to the outside of the case through the spaces formed between recesses 111 and 151 and insulation tapes 130 and 170 when safety films 120 and 160 are melted due to increased heat generation amounts of electrode tabs 110 and 150. In addition, the lengthwise widths of insulation tapes 130 and 170, in the lengthwise direction in which electrode tabs 110 and 150 are drawn out, may be greater than or equal to widths of the sealing portions of case 200. This is for the purpose of preventing electrical short-circuits from occurring between a metal layer 212 of case 200 and electrode tabs 110 and 150 when innermost layer 213 of case 200 is melted by pressure and heat applied in the course of sealing case 200. Insulation tapes 130 and 170 may be formed of a thermally adhesive synthetic resin, for example, a polypropylene (PP)-based resin, specifically, casted polypropylene (CPP).

Meanwhile, the PP-based resin has a melting point in a range of approximately 160° C. to approximately 170° C. Therefore, safety films 120 and 160 formed of the PE-based resin are melted before insulation tapes 130 and 170 formed of the PP-based resin are melted, serving as safety vents.

Case 200 includes an upper case 210 and a lower case 220 roughly integrally formed by folding a center of a substantially rectangular case layer in a lengthwise direction of one side of the substantially rectangular case layer. A receiving part 225, in which electrode assembly 100 is received, is formed in a roughly central area of lower case 220 by, for example, pressing. In addition, a first extension part 221, a second extension part 222, a third extension part 223 and a fourth extension part 224 are formed at the upper end edge of receiving part 225.

The case layer forming case 200 includes an outermost layer 211, a middle layer 212 and an innermost layer 213. Middle layer 212 is formed of a metal foil. In one embodiment according to the principles of the present invention, middle layer 212 is formed of an aluminum foil. Outermost layer 211 is formed on a top surface of middle layer 212 and made of an insulating resin. In one embodiment according to the principles of the present invention, outermost layer 211 is formed of nylon. This is for the purpose of preventing an external surface of case 200 from being damaged and insulating middle layer 212 from the outside. Innermost layer 213 may be formed of a CPP layer made of a thermally adhesive synthetic resin, for example, a PP-based resin. That is to say, innermost layer 213 of case 200 is made of the same resin material as insulation tapes 130 and 170. Thus, during sealing, insulation tapes 130 and 170 positioned on the sealing portions of case 200 can be easily adhered to innermost layer 213 of case 200. In addition, the PP-based resin has a melting point in a range of approximately 160° C. to approximately 170° C. Therefore, safety films 120 and 160 formed of the PE-based resin are melted before innermost layer 213 of case 200 formed of the PP-based resin are melted, serving as safety vents.

Extension parts 221, 222, 223 and 224 are parts remaining after forming receiving part 225 by pressing lower case 220 and extend in a direction away from receiving part 725. Extension parts 221, 222, 223 and 224 are sealed to form the sealing portions such that electrode assembly 100 is received in receiving part 225 and then thermally compressed to an edge of upper case 210.

First extension part 221 is a sealing surface extending in a direction in which electrode tabs 110 and 150 are drawn out and contacts bottom surfaces of insulation tapes 130 and 170 surrounding electrode tabs 110 and 150 during sealing.

As described above, in one embodiment according to the principles of the present invention, the lengthwise widths of insulation tapes 130 and 170, in which electrode tabs 110 and 150 are drawn out, are equal to or greater than the widths of the sealing portions of case 200. For example, a distance between one end 130a and the other end 130b of insulation tape 130, disposed in the direction in which electrode tab 110 is drawn out, is equal to or greater than a distance between one end 221a and the other end 221b of first extension part 221, disposed in the direction in which electrode tab 110 is drawn out.

Meanwhile, the sealing is performed at a temperature in a range of approximately 180° C. to approximately 220° C. The sealing temperature is higher than the melting temperatures of safety films 120 and 160. However, since heat is applied to safety films 120 and 160 only for a very short time of about 2 to 3 seconds during the sealing, the heat is scarcely transferred to melt safety films 120 and 160.

As described above, in the secondary battery constructed as the embodiment, according to the principles of the present invention, when electrode tabs 110 and 150 are overheated, safety films 120 and 160 disposed in electrode tabs 110 and 150 are melted earlier than the sealing portions of case 200 and insulation tapes 130 and 170, serving as safety vents. That is to say, since the secondary battery according to the embodiment of the present invention has safety films 120 and 160 formed in electrode tabs 110 and 150, it is possible to effectively prevent a risk of explosion or fire generated when electrode tabs 110 and 150 are overheated due to malfunction of the secondary battery.

Figure 5:
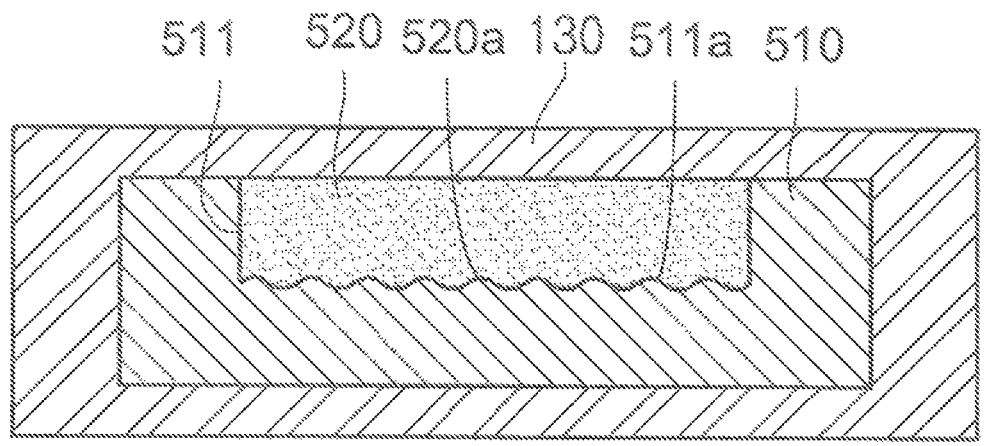
FIG. 5 is a cross-sectional view of a part of a secondary battery constructed as another embodiment according to the principles of the present invention.

Next, a secondary battery constructed as another embodiment according to the principles of the present invention will be described with reference to FIG. 5. FIG. 5 is a cross-sectional view of a part of a secondary battery constructed as the other embodiment according to the principles of the present invention.

Referring to FIG. 5, the secondary battery constructed as the other embodiment according to the principles of the present invention is substantially the same as the secondary battery according to the previous embodiment, except for a recess 511 formed in an electrode tab 510 and a safety film 520. Thus, repeated explanations will be omitted and the following description will focus on different components of both embodiments. In particular, since recess 511 is sized and shaped to correspond to safety film 520, the following description will focus on only safety film 520.

Safety film 520 has a non-planar bottom surface 520a contacting recess 511 of electrode tab 510. In this case, since a contact area between bottom surface 511a of recess 511 and bottom surface 520a of safety film 520 is increased, a reinforced coupling force between electrode tab 510 and safety film 520 is ensured. In addition, the increased contact area between bottom surface 511a of recess 511 and bottom surface 520a of safety film 520 facilitates transfer of the heat from electrode tab 410 and thus the melting of safety film 520 when electrode tab 510 is overheated.

While FIG. 5 shows that the secondary battery according to the embodiment of the present invention includes safety film 520 having a non-planar surface only at bottom surface 520a, the present invention does not limit the shape of safety film 520 thereto. That is to say, safety film 520 may have non-planar surfaces at any surface of its outer surfaces, excluding a surface contacting insulation tape 130. The more the non-planar surfaces are formed, the more the coupling force between safety film 520 and electrode tab 510 is reinforced. In addition, the more the non-planar surfaces are formed, the better the melting efficiency of safety film 520 becomes.

In the foregoing description, safety film 520 of the secondary battery according to the embodiment of the present invention has been described with respect to only first electrode tab 510 by way of example. However, it will be easily appreciated by one skilled in the art that the safety film having the same features as safety film 520 may also be formed in second electrode tab 150. In addition, safety film 520 may have various shapes other than a rectangular box shape, like safety film 120 of the secondary battery according to the previous embodiment.

Figure 6:
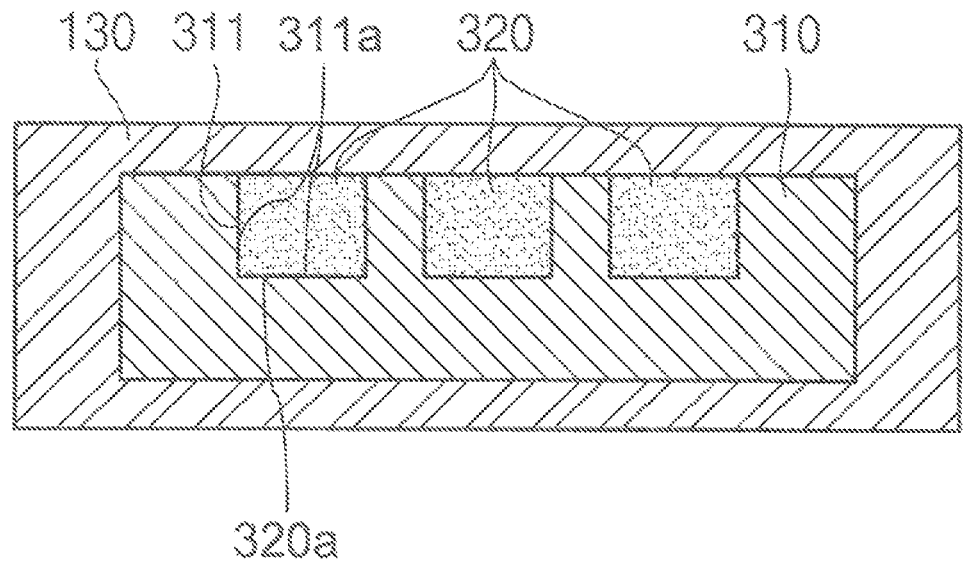
FIG. 6 is a cross-sectional view of a part of a secondary battery constructed as still another embodiment according to the principles of the present invention.

Next, a secondary battery constructed as still another embodiment according to the principals of the present invention will be described with reference to FIG. 6. FIG. 6 is a cross-sectional view of a part of the secondary battery constructed as still another embodiment according to the principals of the present invention, taken along a direction in which the first electrode tab is drawn out. Referring to FIG. 6, the secondary battery according to the embodiment of the present invention is substantially the same as the secondary battery according to the previous embodiment, except for a recess 311 formed in an electrode tab 310 and a safety film 320. Thus, repeated explanations will be omitted and the following description will 11 focus on different components of both embodiments. In particular, since recess 311 is sized and shaped to correspond to safety film 320, the following description will focus on only safety film 320.

Safety film 320 may be divided into a plurality of parts in a widthwise direction of electrode tab 310. In this case, safety film 320 has an increased contact area with respect to an inner surface 311a of electrode tab 310, so that safety film 320 can be melted relatively quickly when electrode tab 310 is overheated, thereby reinforcing the function as a safety vent. In one embodiment according to the principles of the present invention, a sum of widths of the plurality of parts of safety film 320 is in a range of 20% to 50% of a width of first electrode tab 310. If the sum of widths of the plurality of parts of safety film 320 is less than 20% of the width of first electrode tab 310, safety film 320 may not function properly as a safety vent. If the sum of widths of the plurality of parts of safety film 320 is greater than 50% of the width of first electrode tab 310, it is difficult to maintain the rigidity of first electrode tab 310 and electrical resistance of electrode tab 310 may increase.

While FIG. 6 shows that safety film 320 is divided into three parts, the invention is not limited thereto. In the foregoing description, safety film 320 of the secondary battery according to the embodiment of the present invention has been described with respect to only first electrode tab 310 by way of example. However, it will be easily appreciated by one skilled in the art that the safety film having the same features as safety film 320 may also be formed in second electrode tab 150. In addition, safety film 320 may have various shapes other than a rectangular box shape, like safety film 120 of the secondary battery according to the previous embodiment. Further, safety film 320 may have non-planar surfaces at any surface of its outer surfaces 320a, excluding a surface contacting insulation tape 130. In this case, safety film 320 may exert a reinforced function as a safety vent while having an enhanced coupling force with respect to electrode tab 310.

Next, a secondary battery constructed as a further embodiment of the present invention will be described with reference to FIG. 7. FIG. 7 is a cross-sectional view of a part of the secondary battery constructed as the further embodiment of the present invention, taken along a direction in which the first electrode tab is drawn out. Referring to FIG. 7, the secondary battery according to the embodiment of the present invention is substantially the same as the secondary battery according to the previous embodiment, except for configurations, of a recess 411 formed in an electrode tab 410 and a safety film 420 and operations and effects thereof. Thus, repeated explanations will be omitted and the following description will focus on different components of both embodiments. In particular, since recess 411 is sized and shaped to correspond to safety film 420, the following description will focus on only safety film 420.

Safety film 420 may be formed on both top and bottom surfaces 410a and 410b of first electrode tab 410. In this case, safety film 420 may have a reduced thickness, compared to a case where safety film 420 is formed on only on one of top and bottom surfaces of first electrode tab 410. Thus, when first electrode tab 410 is overheated, safety film 420 is melted relatively quickly, thereby exerting a reinforced function as a safety vent. In one embodiment according to the principles of the present invention, a sum of thicknesses of the respective safety films 420 formed on both of top and bottom surfaces 410a and 410b of first electrode tab 410 is in a range of 20% to 50% of a thickness of first electrode tab 410. If the sum of thicknesses of the respective safety films 420 is less than 20% of the thickness of first electrode tab 410, it is difficult for each of the respective safety films 420 to function as safety vents. If the sum of thicknesses of the respective safety films 420 is greater than 50% of the thickness of first electrode tab 410, it is difficult to maintain the rigidity of first electrode tab 410 and electrical resistance of electrode tab 410 may increase.

In the foregoing description, safety film 420 of the secondary battery according to the embodiment of the present invention has been described with respect to only first electrode tab 410 by way of example. However, it will be easily appreciated by one skilled in the art that the safety film having the same features as safety film 420 may also be formed in second electrode tab 150. In addition, safety film 420 may have various shapes other than a rectangular box shape, like safety film 120 of the secondary battery according to the previous embodiment. In addition, as shown in FIG. 5, safety film 420 may have non-planar surfaces at least one surface of its outer surfaces, excluding a surface contacting insulation tape 130. In this case, safety film 420 may exert a reinforced function as a safety vent while having an enhanced coupling force with respect to electrode tab 410. In addition, as shown in FIG. 7, safety film 420 may be divided into a plurality of parts along the widthwise direction of electrode tab 410. In this case, safety film 420 has an increased contact area with respect to an inner surface of electrode tab 410, so that it can be melted relatively quickly when electrode tab 410 is overheated, thereby reinforcing the function as a safety vent.

Case 200 may be fabricated by deforming, such as punching, or by hot pressing, a multi-layered laminated sheet of material having at least a middle layer sandwiched between an outermost layer and an innermost layer. The innermost layer essentially forms a lining on the interior of case 200, and the innermost layer is made of a material that has a melting point which is higher than the melting point of the safety film.

In essence, the strip of safety film 120 forms a sacrificial knock-out through the seal formed by the mating opposite surfaces of the innermost layer which surround electrical insulation tape 130 and form an airtight seal of case 200, thereby permitting the contents held by the formerly sealed case 200 to escape through an opening, or vent, created by the melting and displacement of the partially melted plug formed by safety film 120, thus preventing an explosion, or a fire, due to the occurrence of an extraordinarily high increase in pressure within the sealed case 200, or from an exothermic reaction within the interior of the formerly sealed case 200. Safety film is able, therefore, to serve as a dislodgable safety plug within the seal formed during the closure of the lid and basket which form case 200.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

What is claimed is:

1. A secondary battery, comprising:
   an electrode assembly including a first electrode tab and a second electrode tab;
   and a case accommodating the electrode assembly such that the first and second electrode tabs are exposed to the outside of the case,
   at least one of the first and second electrode tabs has a recess formed to extend in a lengthwise direction of the at least one of the first and second electrode tabs on at least one of top and bottom surfaces of the at least one of the first and second electrode tabs, and
   a safety film, having a same size as a size of the recess, is positioned in the recess.

2. The secondary battery of claim 1, further comprising an electrical insulation tape surrounding the first and second electrode tabs and the safety film.

3. The secondary battery of claim 2, wherein a melting point of the safety film is lower than that of the electrical insulation tape.

4. The secondary battery of claim 2, wherein opposing ends of the safety film in the lengthwise direction of the at least one of the first and second electrode tabs are exposed by the electrical insulation tape.

5. The secondary battery of claim 1, wherein the case includes walls fabricated with an innermost layer, a middle layer and an outermost layer, and a melting point of the safety film is lower than that of the innermost layer.

6. The secondary battery of claim 1, wherein the melting point of the safety film is in a range of approximately 80° C. to approximately 90° C.

7. The secondary battery of claim 1, wherein the safety film has a thickness of approximately 20% to approximately 50% of that of the at least one of the first and second electrode tabs.

8. The secondary battery of claim 1, wherein the safety film has a width of approximately 20% to approximately 50% of that of the at least one of the first and second electrode tabs.

9. The secondary battery of claim 1, wherein the safety film has a non-planar surface contacting the inner surface of the recess formed in the at least one of the first and second electrode tabs.

10. The secondary battery of claim 1, wherein the safety film is divided into a plurality of parts in a widthwise direction of the at least one of the first and second electrode tabs.

11. The secondary battery of claim 10, wherein a sum of widths of the plurality of parts of the safety film is approximately 20% to approximately 50% of the width of the at least one of the first and second electrode tabs.

12. The secondary battery of claim 1, wherein the recess is formed on both of the top and bottom surfaces of the at least one of the first and second electrode tabs, and the safety film is formed in the recess formed on both of the top and bottom surfaces of the at least one of the first and second electrode tabs.

13. The secondary battery of claim 12, wherein a sum of thicknesses of the respective safety film formed in the recess on both of the top and bottom surfaces of the at least one of the first and second electrode tabs is approximately 20% to approximately 50% of the thickness of the at least one of the first and second electrode tabs.

14. The secondary battery of claim 1, wherein the safety film is formed of low density polyethylene.

15. The secondary battery of claim 1, wherein a top surface of the safety film is coplanar and flush with the top surface of the at least one of the first and second electrode tabs formed with the recess.

16. The secondary battery of claim 1, wherein the first electrode tab is formed as a positive electrode tab, the second electrode tab is formed as a negative electrode tab, the first electrode tab includes a recess formed in a lengthwise direction of the first electrode tab, and the safety film is positioned in the recess.

17. The secondary battery of claim 1, wherein an innermost layer of the case is formed of cast polypropylene.

* * * * *